Figure 2:
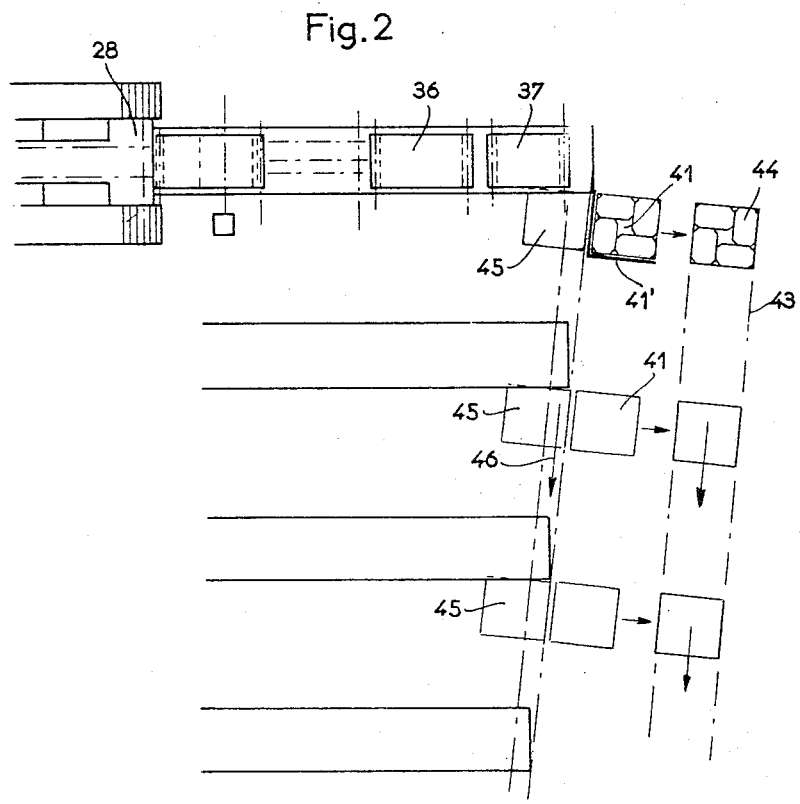

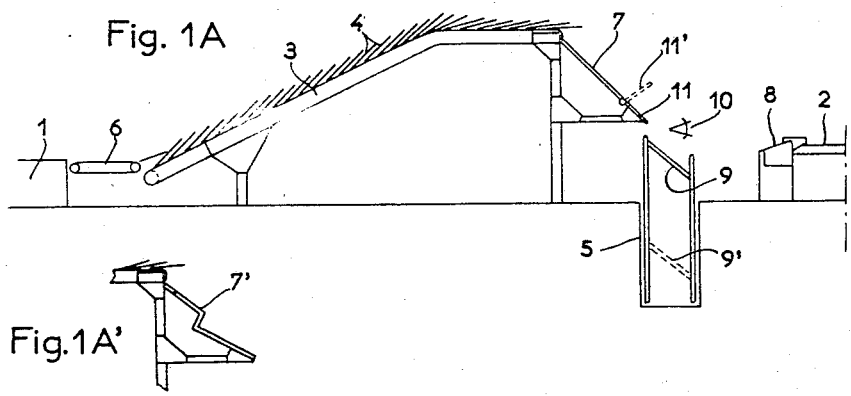
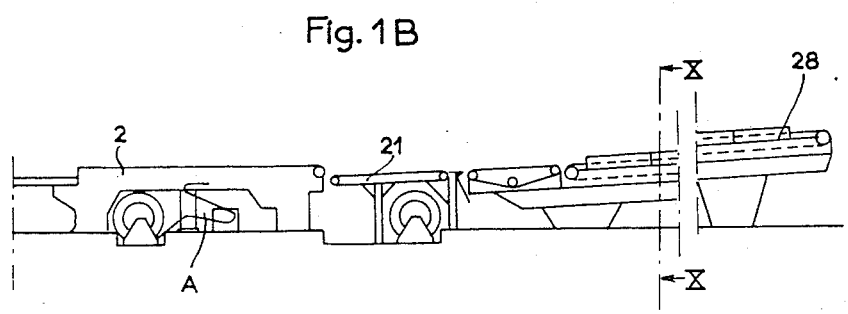
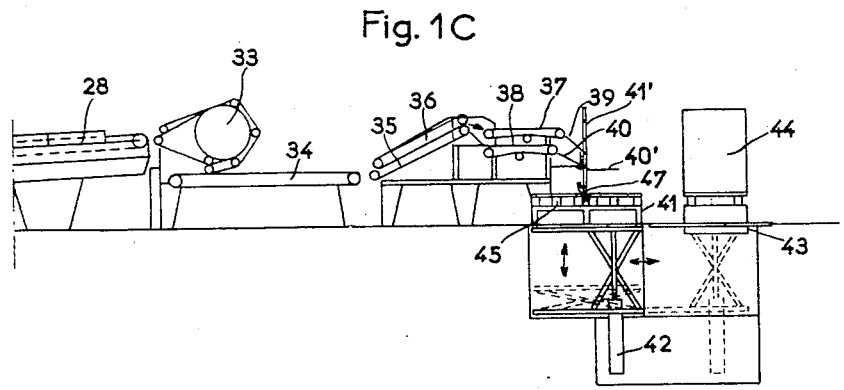

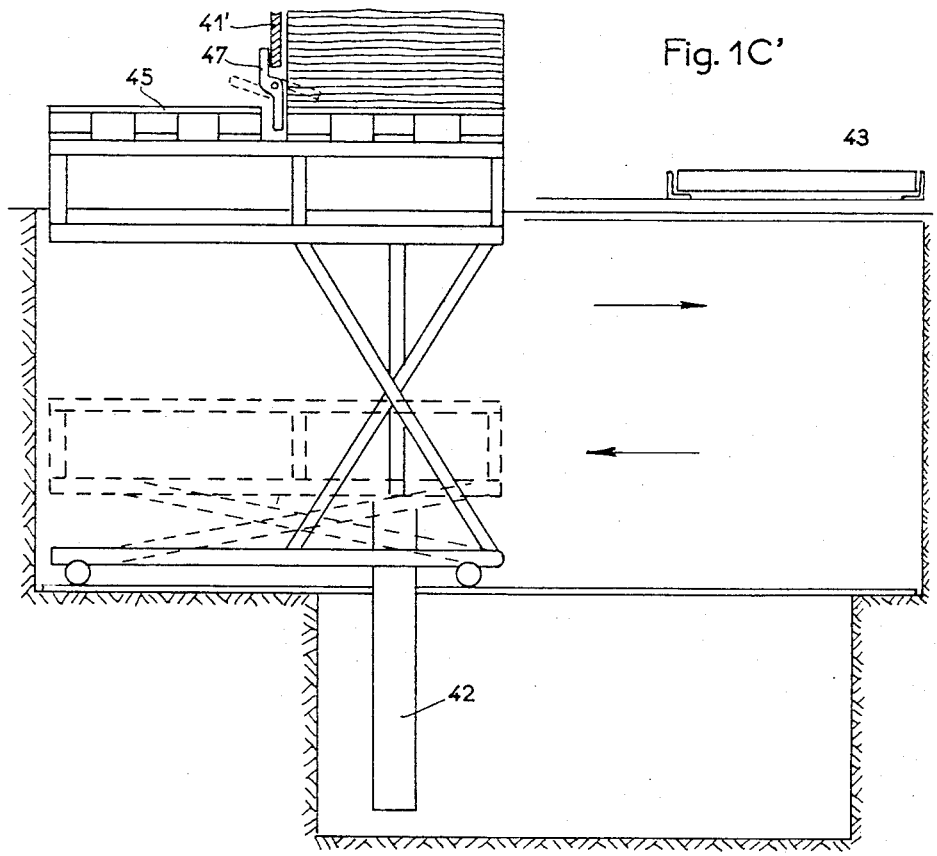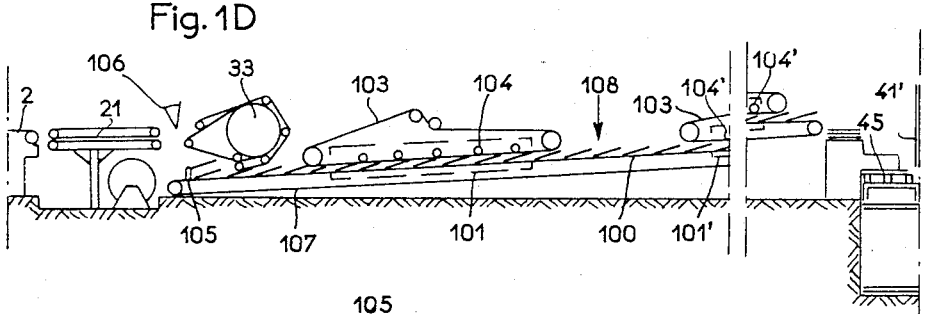

INVENTOR
MARIUS BERGHGRACHT

BY
ATTORNEYS

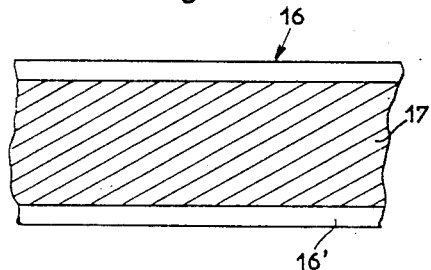
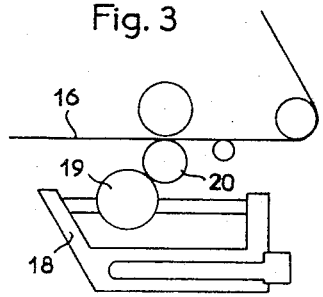
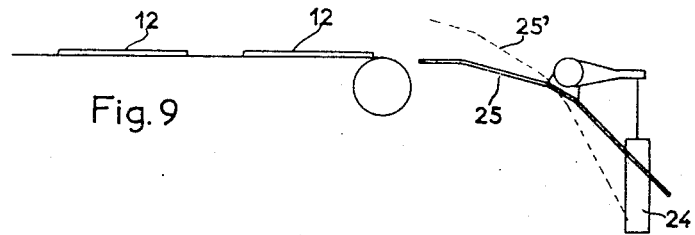
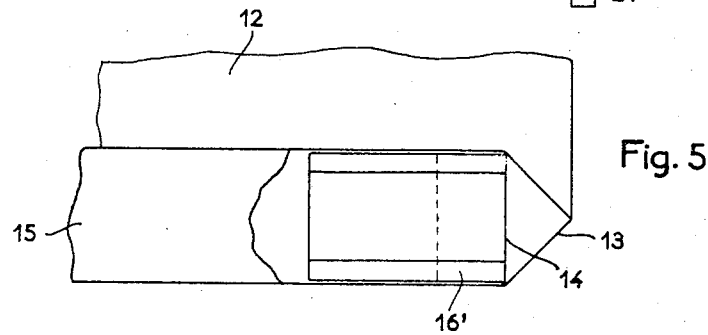
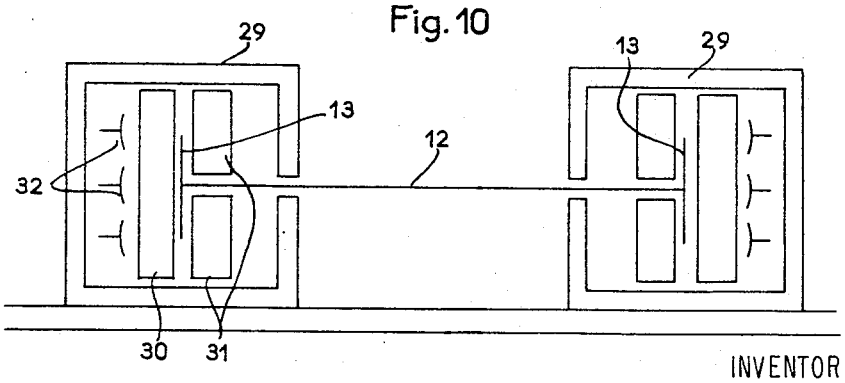

March 26, 1968   M. BERGHGRACHT   3,374,714
INSTALLATIONS FOR THE MANUFACTURE OF
LARGE-CAPACITY BAGS
Filed Aug. 10, 1965   6 Sheets-Sheet 5

INVENTOR
MARIUS BERGHGRACHT

BY  *Imirie and Smiley*
ATTORNEYS

March 26, 1968  M. BERGHGRACHT  3,374,714
INSTALLATIONS FOR THE MANUFACTURE OF
LARGE-CAPACITY BAGS Filed Aug. 10, 1965  6 Sheets-Sheet 6

INVENTOR
MARIUS BERGHGRACHT

BY  ATTORNEYS

United States Patent Office 3,374,714
Patented Mar. 26, 1968

3,374,714
INSTALLATIONS FOR THE MANUFACTURE OF LARGE-CAPACITY BAGS
Marius Berghgracht, Le Vieux Logis, Place Joyale, Vineuil-St.-Firmin, Oise, France
Filed Aug. 10, 1965, Ser. No. 478,554
Claims priority, application Luxembourg, Aug. 20, 1964, 46,804
19 Claims. (Cl. 93—8)

The invention concerns improvements to installations for the manufacture of large-capacity bags, generally multi-ply bags, made of strong paper or of kraft paper, provided with a flat bottom at one of their ends or most of all at both their ends, a valve being, in the latter case, provided for at one of the ends in order to facilitate the automatic filling of the bags.

The installations of this kind have two automatic high production machines, one, called the tubemaker, for the formation of blanks of bags or sections of generally multi-ply tubes beginning from several continuous bands of paper which are folded on themselves and closed longitudinally by gluing, the continuous tube formed being cut up in order to form the said sections, whilst the other machine, called the "bottommaker," forms the bottom or bottoms of the bags and eventually provides these with a valve. But the production line formed by the installation has imperfections, demanding many manual interventions at various points along the line, whether for the transferring of the bags in the process of formation from one part of the installation to the other, or for the checking of the bags and the elimination of malformed bags, or again for the placing of the bags into bundles for their packaging before transport.

The object of the invention is to make the installation automatic and thus to reduce appreciably the number of people necessary for operating the installation, at the same time greatly reducing the danger of the bags being malformed and improving their quality, in particular from the point of view of the glued parts and their drying.

Figure 12:
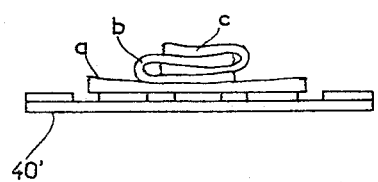
Figure 13:
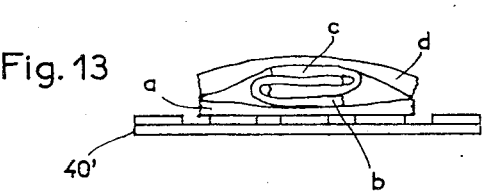
Figure 6:
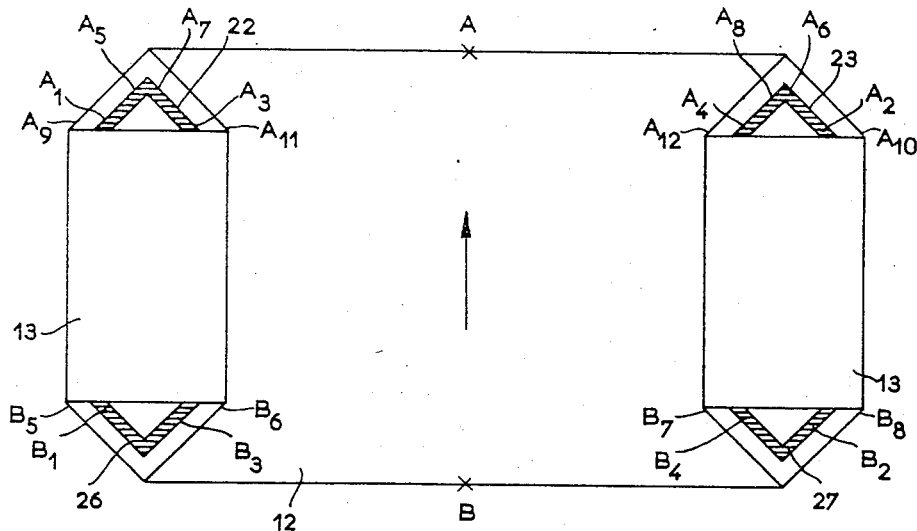
Figure 7:
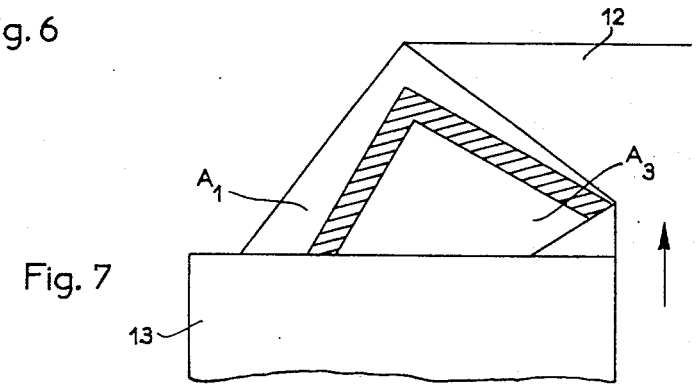
Figure 8:
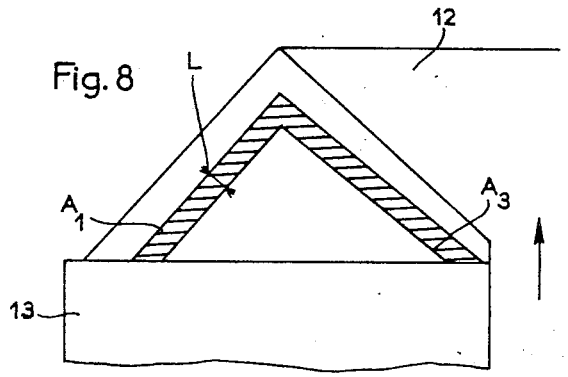
Figure 14:
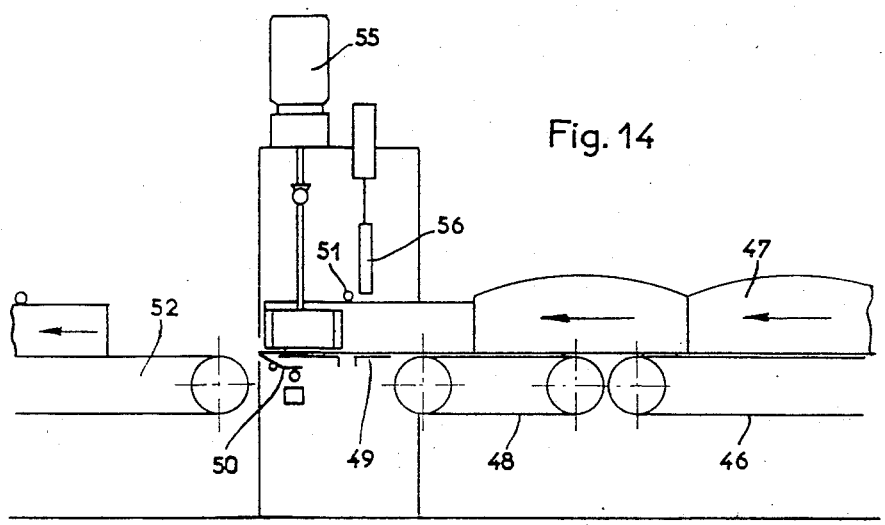
Figure 15:
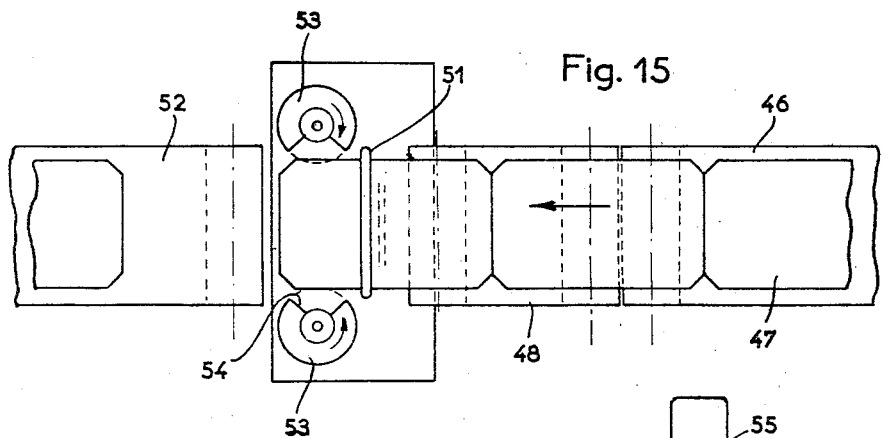
Figure 16:
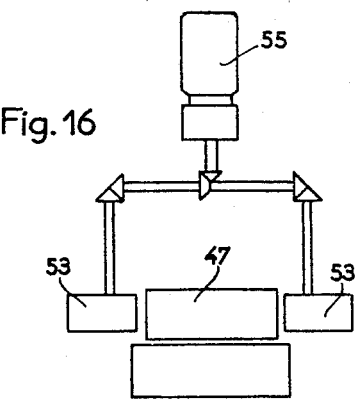

By way of demonstration, several different ways of carrying out the various improvements according to the invention, applicable separately or in combination to an installation of the specified type, will be described hereafter with reference to the attached schematic drawings in which:

FIGURE 1 is a side elevation of three successive parts of such an installation, these being shown in FIGURE 1A, FIGURE 1B and FIGURE 1C, respectively, FIGURE 1A' showing a different method of execution of a detail of FIGURE 1A, whilst FIGURE 1C' shows a part of FIGURE 1C on a larger scale, FIGURE 1D shows a different method of execution of the part of the machine shown in FIGURES 1B and 1C;

FIGURE 1D' shows a detail of it seen in plan view,

FIGURE 2 is a plan view of the part shown in FIGURE 1C,

FIGURE 3 shows, on a larger scale, a side elevation, of an apparatus applicable to the part of the installation shown in FIGURE 1B, for the formation and the treatment of the valve of the bag, FIGURE 4 is a plan view of a treated band of paper used in the formation of the valve, FIGURE 5 shows a fragmentary view of a valved bag, a part of the bottom being removed, FIGURE 6 shows a formed bag, the bottoms folded flat, as well as a system for checking the correct gluing and labelling of the bottoms, FIGURES 7 and 8 show fragmentary views of such a bag with bottom incorrectly formed, FIGURE 9 shows an apparatus for the rejection of malformed bags from the production line, FIGURE 10 is a sectional view, on a larger scale, along the line X—X of FIGURE 1B, FIGURES 11, 12 and 13 show views respectively during and after the formation of a bundle of bags, FIGURE 14 is a side elevation of an apparatus for tying up a bundle of bags, FIGURE 15 shows a plan view of it, certain parts being removed, and FIGURE 16 shows an end view of this apparatus.

The installation has a tubemaker which forms the blanks of bags, in other words sections of generally multi-ply tubes in kraft or like paper, which are cut up at the end 1 of the tubemaker. These blanks have to be transferred to the "bottom-maker" 2 which forms the bottom or bottoms of the bag and on which the blanks position themselves in the direction of their width, while the tubemaker cuts them up in the direction of their length.

Normally, the tubemaker has a production rhythm faster than the machine forming the bottoms, for example 160 and 120 tubes per minute respectively. In the usual installations this difference in rhythm, which it is very advantageous to maintain, gives rise to difficulties, the transferring from one machine to the other being made manually or by a conveyor belt. It is necessary to store the tubes on pallets from which result gluing irregularities and a waviness in the tubes, causing difficulties on the bottom-maker, which increases the manual work, reduces the rhythm of production of the installation and causes waste.

According to the invention, there is inserted between the two machines a slow conveyor belt 3 which can carry tilewise quite a large number of tubes 4 and which feeds a magazine 5, made up of a pit, being able likewise to contain a reserve of tubes. The tubes should overlap on the belt 3 and to ensure efficient stacking, a small fast-moving belt 6 is provided for, on which the tubes issuing from the tubemaker 1 arrive one after the other and which projects the tubes in such a way that they will lie obliquely one on top of the other on the slow belt 3. From the latter, the tubes slide on the inclined plane 7 into the storage pit 5, whence a workman or an automatic device periodically removes bundles of tubes in order to place them, turned through 90° in their plane, into the feed magazine 8 of the bottom-maker.

In normal working, the excess produced by the tubemaker is stored in the pit 5, on a reception table 9, of which the progressive downward descent is controlled automatically by a photo-electric cell 10 placed between the inclined plane 7 and the pit 5 and reacting to the interruption of its beam by the maximum level of tubes stored on the table 9, so as to obtain a constant fall between the outlet from the slide table and the maximum level of the stored tubes. After the extraction of a bundle of tubes, the electric equipment immediately ensures the automatic raising of the whole storage assembly on the table 9, to the said carefully chosen maximum level, which will normally be located somewhat above the pit for facilitating the extraction of the tubes. When a position 9' corresponding for example to two thirds of the capacity of the pit 5, after quite a long time of excess production, is reached by the table 9, it actuates a signal telling the tubemaker controller to slow down the speed of the tubemaker in order to bring it into line with that of the bottom-maker. The last reserve, for example the remaining third of the capacity of the pit, is to be used in the event of the bottom-maker stopping. This last reserve will preferably, be sufficient to enable the tubemaker to continue to function for a time at least equal to a normal stop of the bottom-maker. The restarting of the latter allows the tubemaker to regain its normal speed gradually.

If the tubemaker stops, the reserve of tubes which is on the belt 3 and in the pit 5 allows the feed to the bottom-maker to continue for a time at least equal to the length of a normal stop of the tubemaker. For effecting this feed, tubes are extracted by batches from the pit 5 and the raising of the table 9 is effected automatically by the electric equipment gradually with the extraction of tubes and to the said maximum level, thus ensuring a correct height of work and a constant distance of fall from the slide table 7.

In a variant, this table 7 can be made with a stepped profile, e.g. in two steps as shown at 7′ in FIGURE 1A′. Experience has shown that the breakdown in the tile-arrangement of tubes at 4 only happens periodically in batches of several tubes, for example of about thirty. Thus the necessary time is available to extract a batch or bundle of tubes from the pit 5, between the fall of two successive bundles from the tile-arrangement 4. This avoids the use of the stop flap 11, of which more later.

The speed variations of the tubemaker will automatically produce variations in the speed, always faster, of the small belt 6. The stopping of the bottom-maker can automatically cause the reduction in the speed of the tubemaker.

During normal working, one can periodically raise bundles of tubes from the pit 5. In order to avoid this being inconvenienced by the falling of tubes, a stop flap 11 hinged to the bottom of the inclined plane can momentarily be brought into the position 11′ e.g. by the action of a pedal actuated by a workman or automatically.

It is worth noting that the drying of the tubes is greatly improved, thanks to the fact that both on the belt 3 and in the pit 5, the tubes dry quite flat and under an even and constant pressure from the stacking of the tubes.

If the bottom-maker 2 produces bags 12 with two flat bottoms 13, it makes a valve in one of these bottoms. This is done by inserting, by known means, a band of flat or tubular paper 14 glued as needed, before the final folding of the bottom, which is afterwards closed by a label 15. An opening or valve is thus formed giving free access to the inside of the bag. This opening was frequently blocked by several spots of gluing caused during manufacture by unavoidable bespatterings. Until now the checking of the valve was made manually at the end of the manufacturing, which required manual work of importance. This is done away with by the invention thanks to the application of a water resisting coating on one surface of the band of paper forming the valve, before the gluing of this band. This can be brought about as shown in FIGURES 4-5, with the help of an apparatus positioned at A in the bottom-maker (FIGURE 1B).

The band 16, from which the valves 14 will be cut, is coated with water-resisting material on its central part 17, a little less wide than the bottom 13 of a bag, on the hidden surface of the valve, looking at FIGURE 5, and gluing whereof must be avoided. The said material contained in the trough 18 is carried onto the band 16 by means of the rollers 19 and 20, the latter being of a width the same as that of the area 17. The band is drawn along by feed rollers acting on the uncoated areas 16′, which in general will be almost completely folded back and glued on the upper surface of the valve, looking at FIGURE 5.

The invention likewise provides for an automatic system for control of the bags, especially for the checking of the correct folding of the bottom or bottoms and of the positioning of the labels on the bottoms, whilst the bags progress on a belt 21 (FIGURE 1B) in the direction of the arrows in FIGURES 6, 7, 8, illustrating this system of control by means of photo-electric cells.

When the front edge of the bag 12 reaches a pilot cell A, which acts on masking, that is at the moment of the interruption of the beam of the cell, this pilot cell frees the activity of the reflection cells $A_1$, $A_2$, $A_3$ and $A_4$, which, if the bottoms of the latter have been correctly folded, should be at that moment opposite the coloured marks or areas 22, 23 printed in advance on the bag. The printing of these areas will usually be done on the tubemaker. If one of these areas is not opposite one of the cells $A_1$, $A_2$, $A_3$, $A_4$, an impulse is transmitted to an electric shutter 24 which then brings a flap 25 into the position 25′, so as to reject the malformed bag. A part of such a malformed bag is shown in FIGURE 7. As, in this case, the cells $A_1$, $A_3$ are not opposite the coloured marks, the bag will be rejected.

According to the invention the coloured marks are advantageously made up of an angled band 22, 23, whose sides should normally form an angle of 45° with the edge of the bag, the said sides normally being parallel with the sides of the end triangles of a correctly folded bottom. The width L of the areas 22, 23 will be determined as a function of the error tolerance admissible in practice, since the cells are directed on an ideal line and since the amount of errors that they will permit will therefore depend directly on the size of the marking area.

A greater precision of control can be obtained by using supplementary cells, for example at $A_5$–$A_8$, as shown in FIGURE 6.

A second pilot cell B is provided for in order to work on unmasking, that is at the moment when the beam of the cell is restored, i.e. at the moment when the trailing edge of the bag passes the cell B. The latter then activates reflection cells $B_1$, $B_2$, and eventually supplementary cells, which act in the same way as the cells $A_1$ etc., according to whether they are, or are not, opposite the printed areas or marks 26, 27 at the moment of unmasking of the pilot cell B.

Thanks to the separation of the two groups of cells A and B, the latter ought not to be moved if the width of the bags varies. If an installation were to be provided for in order to deal always with bags of the same width, the pilot cell B would be done away with and all the reflection cells of the groups A and B would be controlled by the pilot cell A.

If the length of the bags varies, the distance apart of the two groups of cells working on the two bottoms of the bag will be altered in consequence, and this is made easy by their being mounted on slides perpendicular to the direction of the movement of the bags.

The checking can also be made without the need for the coloured marks 22, 23, 26 and 27. In this case the cells $A_1$ to $A_8$ and $B_1$ to $B_4$ are done away with and replaced by reflection cells $A_9$, $A_{10}$, $A_{11}$ and $A_{12}$ and $B_5$, $B_6$, $B_7$ and $B_8$ sighting the edges of the folds of the bottoms, the inside edges $A_{11}$, $A_{12}$, $B_6$ and $B_7$ being marked by the shadow of the fold.

The error tolerance of the folding is then ensured by a system of delay of the response times of the cells $A_9$ to $A_{12}$ and $B_5$ to $B_8$, this system being mounted in the electric circuit which includes these cells. This delay being adjustable, the tolerance can be varied according to what is being made.

Thanks to the automatic rejection of malformed bags, these will no longer undergo the latter operations of the production line, and this increases the efficiency of the installation. In addition, this rejection of the defective bags at the moment when the drying has not yet been done allows for the recovery of some of the bags.

In order to speed up and improve the drying of the bottoms of the bags and so permit, at the outlet of the bottom-maker, fast production of bundles or pallets of bags in order to allow their immediate dispatch, the invention provides for the placing of these bottoms perpendicularly to the body of the bags during the drying operation.

To this end, the invention provides that the dryer 28 (FIGURES 1B and 1C) shall have two chests 29, of which one can be fixed and the other movable to adapt to the length of the bags 12 to be treated. Each bottom 13 is held between the mutually spaced pressure rollers 30, 31 which ensure a good fastening of the gluing joints.

This apparatus allows a good air circulation on all the surfaces of the bottoms of the bags, and thus ensures a balanced drying which can be caused by hot air ventilation and/or infra-red heating 32.

In the case of the bags having only one bottom, one of the chests 29 can be done away with.

The dried bags can eventually be turned over by some suitable apparatus 33 (FIGURE 1C), are then transported by a belt 34, then between two belts 35, 36, and are then led, by means of some suitable counting apparatus in batches of a desired number of bags, onto the belts 37, 38, being, according to need, able to move themselves laterally and alternately and the belts bring them to the outlets 39, 40, for example in groups of 10 in one and of 15 in the other, the bundle of 50 being automatically formed by superposition at 40'. In this way, a workman can easily guide the bundles of for example 50 bags towards the last treatment which is tying up or putting onto pallets.

A different method of execution of the part of the machine shown in FIGURES 1B and 1C is shown in FIGURE 1D. In this case, the bags delivered by the belt 21 are put, tilewise, at 100 on a conveyor 107 with a speed slower than that of the belt 21, in general in a ratio found between 1:15 and 1:5. The bags are led, to a reception position to be put into bundles, through a tunnel of hot air 101 (which can comprise two chests similar to those of the tunnel 28) to dry the bottoms of the bags, a constant pressure being produced by an upper feed belt 103 provided with rollers 104 exerting a pressure that is controlled as desired. The tunnel 101 can eventually be made in two sections 101 and 101', which allows, if the bottoms are uppermost, a visual checking of the folding of the bottoms of the bags, by workmen placed at 108 on each side of the conveyor 107, especially in the event of a failure in the automatic control.

The turnover drum 35 can eventually be kept, in this variant, and be placed immediately at the outlet of the belt 21. It can then work with an adjustable stop 105, controlled from a counting cell 106, to orientate the groups of bags (for example according to a cycle 15–10–10–15) alternately towards the right and towards the left (FIGURE 1D'), according to the alternate orientation of the stop 105, which can be formed by a plate.

The turnover drum 33 can eventually be done away with, especially if the bottom-maker 2 makes the bottoms uppermost. The stop 105 will then be arranged above the conveyor 107 at the outlet of the belt 21.

In either case the bags are thrown against the stop 105, take a correspondingly oblique position and fall onto the conveyor 107.

According to an alternative embodiment, after the passage of each series of bags, thus at each change of the position of the stop 105, the mechanism controlled by the cell 106 can produce a rapid displacement of the conveyor followed by a stop or slowing down thereof, during the arrival of the following series of bags, so as to build up bundles of bags on the conveyor.

Figure 11:
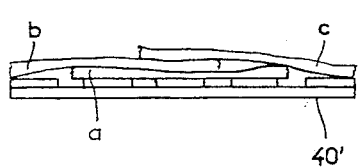

According to the invention, the bundles of e.g. 50 bags are advantageously formed, as shown in FIGURES 11 to 13, of four groups of bags, of which the two middle ones b, c, are placed with opposing longitudinal displacements on the lower group a and afterwards are folded one into the other before being covered up again by the upper group d, in order to form a balanced bundle of 50 bags.

The invention also provides for improvements in the means for formation and transportation of groups of bundles of bags on a pallet, that is a tray on which the bundles of bags are stacked, the whole being afterwards bound up for dispatch.

At the exit of a production line, a workman arranges the bundles of for example 50 bags on a pallet placed on a trolley 41 arranging them for example interengaged as shown in FIGURE 2, a fixed angled stacking template 41' making this arrangement easy. By means of a pedal, the operator acts on a jack 42 to lower the trolley gradually so as to maintain a convenient stacking height. When the pallet is full, for example to a height of about 1.80 m., the operator works a press-button which automatically produces: first of all the raising of the trolley to its top position and its movement to above a roller-conveyor 43, the trolley supporting the pallet by means of rails which can travel between the rollers, then the lowering of the trolley so as to cause the taking over of the loaded pallet 44 by this conveyor which takes it towards a normal binding press which reunites the pallet and its load, and last of all the returning of the trolley to the loading position (FIGURE 1C).

At the end of the lifting travel of the trolley, the latter also takes as load a new pallet, previously placed at 45 on brackets allowing the lifting of the trolley.

The lateral moving operation is then made with the new pallet, of which the movement towards the right is not impeded by the removable stops 47 mounted on the fixed template 41'. Returning, therefore during the movement towards the left, the new pallet is halted by the stops 47 at position 41 (FIGURE 1C).

The stacking of the bundles of bags can be carried out during the movement, which in practice leaves no dead time at the reception of the bundles of bags to be stacked.

Several production lines placed parallel, as shown in FIGURE 2, can feed the same conveyor 43 to bring the pallets to the binding press.

If the bundles of for example 50 bags are to be tied up, the operator places these bundles on a conveyor belt 46 which takes them towards an automatic tyer according to the invention, illustrated in FIGURES 14 to 16. The bundles of bags 47 brought by the continuously moving feed belt 46 pass onto the intermittently moving belt 48 that introduces the bundles one by one into the machine. When a bundle has reached the desired position on the table 49 of the tyer, it acts on an end-of-travel apparatus 50 which automatically starts the cycle of the following operations: the stopping of the belt 48, the lowering of the press 56 of any type, the tying up at 51 by any appropriate means, the putting into action of an ejection system which brings the tied bundle onto a continuously moving conveyor belt 52, after which the cycle begins again.

According to the invention, the ejection system has two rollers 53 which only feed for part of their circumference and which act on the side surfaces of the bundles of bags 47. These rollers have a diameter such that they can exert a pressure on the side surfaces of the bundle but remain free when an indentation 54 provided for in their periphery is opposite the bundle. The rollers 53 are driven by a motor/brake 55, which, after each actuation of the rollers to send a bundle onto the belt 52, always stops in the illustrated position, in such a way as to permit the free arrival of the next bundle onto the table 49.

What I claim is:

1. Installation for the manufacture of large-capacity bags from tubes of strong paper or the like, comprising a tubemaker for forming the tubes to be transformed each into a bag and a bottom-maker for forming a flat bottom at least at one end of each tube, characterized in that it includes means for supporting a pile of tubes delivered by the tubemaker and intended to feed the bottom-maker, a continuous conveyor for the bags delivered by the bottom-maker and placed separately on the conveyor, and means arranged adjacent the conveyor for controlling the correct folding of the bottoms of the bags during the passage of the bags under these control means, by checking the position of marks being part of the bottoms, said control means causing the rejection of the malformed bags.

2. Installation as claimed in claim 1, wherein the means for supporting the tubes delivered by the tubemaker include a pit, a movable table mounted therein for supporting the tubes piled up in the pit, a photo-electric cell reacting to the upper level of the pile of tubes and controlling the movements of said table so as to maintain said level substantially constant.

3. Installation as claimed in claim 2, wherein an alarm is brought into action by said table when it reaches an intermediate position of descent.

4. Installation as claimed in claim 2, further including a conveyor belt moving slower than the delivery of the tubemaker and upon which the tubes are arranged tilewise, said conveyor belt being followed by an inclined plane for directing the tubes into said pit.

5. Installation as claimed in claim 4, wherein said inclined plane has a stepped profile.

6. Installation as claimed in claim 4, wherein said inclined plane has its lower end formed by a hinged flap capable of being turned upwards to form a stop.

7. Installation as claimed in claim 4, wherein said slow conveyor belt is preceded by a more fastly moving conveyor belt.

8. Installation as claimed in claim 1, having a tube maker including a device for forming a valve in a bottom of each bag by means of a partially glued band of paper or the like inserted into said bottom wherein means are provided for coating with a water-resistant material, before the gluing of said band, one of the surfaces thereof over a width corresponding to the required size of the valve opening.

9. Installation as claimed in claim 1, wherein the means for controlling the correct folding of the bottoms include photo-electric reflection cells activated by a pilot cell at the moment when an edge of the moving bags reaches the latter and causing the rejection of the bag if said marks are not then opposite the said reflection cells.

10. Installation as claimed in claim 9, wherein said controlling means include a first group of reflection cells activated by a first pilot cell working with the leading edge of the bag, and a second group of reflection cells activated by a second pilot cell working with the trailing edge of the bag.

11. Installation as claimed in claim 9, wherein said reflection cells are provided with a system of delay of the response time thereby to avoid rejection of the bag if the marks reach the cells within a determined delay.

12. Installation as claimed in claim 9, wherein said marks are formed by coloured areas printed on the bottoms of the bags and having a size determined as a function of the tolerance of error of the folding of said bottoms.

13. Installation as claimed in claim 1, further including a conveyor belt for receiving the manufactured bags and at least one drying tunnel through which said belt conveys the bottom zones of the bags.

14. Installation as claimed in claim 13, further including means for depositing the bags tilewise on said conveyor belt.

15. Installation as claimed in claim 13, further including a movable stop arranged in the path of movement of the bags before they are deposited on said conveyor belt and which can be brought in two different oblique positions relative to the direction of movement of the conveyor belt, and counting means arranged before said stop and changing the position thereof after the passage of each group of a desired number of bags.

16. Installation as claimed in claim 13, wherein rollers are arranged in each tunnel for acting upon the bottoms of the bags and bring them into a position substantially perpendicular to the body of the bags.

17. Installation as claimed in claim 1, further including a lift-conveyor trolley for supporting a pallet for loading bundles of bags formed by groups of bags folded upon themselves, said trolley being mounted for alternative movement between a loading position and a position for depositing the loaded pallet upon a conveyor, a jack supporting the trolley, and means being provided for lowering the trolley during its loading and lifting it thereafter.

18. Installation as claimed in claim 17, wherein the trolley is capable of supporting two pallets, a fixed template being arranged above the latter, half way the length of the trolley when the latter is in its loading position, for facilitating the loading of one of the pallets, a movable stop being arranged at the lower end of the template for allowing the passage of the empty pallet under the template during the movement of the trolley towards the conveyor and stopping it during the return movement.

19. Installation as claimed in claim 1, further including an automatic tyer comprising an intermittently moving conveyor belt for receiving bundles of bags to be tied up, formed by groups of bags folded upon themselves, an end-of-travel device activated by the bundle arriving in the tying position and causing the stopping of the said belt, the starting of a tying system and then the setting in motion of members for the ejection of the tied bundle, these members being formed by rotating rollers acting by one part of their periphery on the side surfaces of a bundle of bags in the direction of its ejection, said rollers being automatically stopped in their inactive position after each ejection operation.

No references cited.

BERNARD STICKNEY, *Primary Examiner.*